United States Patent [19]

Sprung

[11] Patent Number: 4,996,791
[45] Date of Patent: Mar. 5, 1991

[54] METHOD AND STRUCTURE FOR IMPROVED NATURAL LIGHTING FOR PLANT GROWTH

[76] Inventor: Philip D. Sprung, c/o 1001-10th Avenue, SW., Calgary, Alberta, Canada, T2R 0B7

[21] Appl. No.: 280,176

[22] Filed: Dec. 5, 1988

Related U.S. Application Data

[63] Continuation of Ser. No. 947,699, Dec. 30, 1986, abandoned.

[51] Int. Cl.⁵ .............................................. A01G 9/00
[52] U.S. Cl. ........................................... 47/17; 47/26; 47/48.5
[58] Field of Search ................... 47/17, 19, 26, 27, 62, 47/65, 66, 82, 39; 52/747; 126/428

[56] References Cited

U.S. PATENT DOCUMENTS

| | | | |
|---|---|---|---|
| 3,461,605 | 8/1969 | Stanhope | 47/17 |
| 4,077,158 | 3/1978 | England | 47/17 |
| 4,137,687 | 2/1979 | Sprung | 52/747 |
| 4,195,441 | 4/1980 | Baldwin | 47/17 |
| 4,352,256 | 10/1982 | Kranz | 47/17 |

*Primary Examiner*—Robert A. Hafer
*Assistant Examiner*—Charles H. Sam
*Attorney, Agent, or Firm*—Kenyon & Kenyon

[57] ABSTRACT

A method and structure for improved natural lighting for plant growth, particularly for mass production of horticultural crops in environmental conditions where normal solar lighting may be inadequate for horticultural production within a greenhouse structure. The structure comprises a translucent shell on a base, the shell and base enclosing a predetermined space within which plants are to be grown. A reflective surface is situated adjacent major portions of the base, outside the shell and preferably below the level of the base, to reflect solar radiation into the space through the shell. The structure may also be provided with other features tending to increase the exposure of solar radiation to the plants.

12 Claims, 4 Drawing Sheets

METHOD AND STRUCTURE FOR IMPROVED NATURAL LIGHTING FOR PLANT GROWTH

This is a continuation of application Ser. No. 947,699 filed Dec. 30, 1986 now abandoned.

BACKGROUND OF THE INVENTION

This invention relates to a method and structure for improved natural lighting for plant growth and more particularly to a method and structure for mass production of horticultural crops in environmental conditions where solar lighting under conventional conditions may be inadequate for horticultural production within a greenhouse structure.

Traditional greenhouse structures consisting of transparent panes of glass forming a roof to enclose a growing area, drawing air from the outside and having a heating system for winter months, while adequate for many purposes, possess many shortcomings which make them unsuitable for year-round production of many types of fruits and vegetables in certain climatic conditions, e.g. in climates where temperature and light conditions may be poor. Because such greenhouses often are not well sealed against the outside environment, unsuitable temperature differentials may be created within. As well, outside air which may contain substances which are not conducive to proper growth of plants, is permitted to enter. Also, exhaust products from the greenhouse heating system, which often is a natural gas or oil furnace may be present in the environment within such greenhouses again causing reduced plant growth. The water which is used in such greenhouses is often local water and again may contain impurities or compositions which impede plant growth. There is an increasing awareness of the detrimental impact of impurities in the air or water on plant growth. In addition, the concentration of elements for plant growth such as calcium, nitrogen and phosphorous in water being fed to plants in conventional greenhouses may change from day-to-day, resulting in irregular plant growth.

As a result, in recent years there has been a trend towards development of controlled environment horticultural or agricultural installations. For example, Canadian Patent No. 1,097,075 of Miller issued Mar. 10, 1981 describes and illustrates a nutrient supply system for such a controlled environment agricultural installation incorporating nutrient film techniques in which plant root masses are arranged to be wetted by contact with a small stream of liquid nutrient. Capillary attraction or wicking then is relied upon to extend the nutrient-wetted area over and through the entire root mass. Nutrient supply is achieved by positioning the plant roots in long troughs and flowing a thin stream of liquid nutrient along the bottom of the trough permitting the stream to contact each of the plant root masses as it flows along. Excess nutrient is recycled usually after any needed replenishment of its compositional elements.

Such attempts to control in a greenhouse the various conditions responsible for plant growth have heretofore been extremely limited in scope. Thus, for example, in Miller Canadian Patent No. 1,097,075, only the nutrient feed is controlled. In Canadian Patent No. 982,426 of Delano et al issued Jan. 27, 1976, a method of controlling the amount of solar heat and light which enters a glass or plastic greenhouse is described wherein a liquid is coated on the glass or plastic film of the greenhouse. The liquid dries into a coating which is transparent under certain conditions and non-transparent under other conditions. In Canadian Patent No. 955,748 of Glatti et al. issued Oct. 8, 1984, the light passing through a translucent covering of a greenhouse is partially controlled by coating the inner surface of the translucent covering with a surface-active agent, which surface-active agent reduces the contact angle of water-condensate droplets formed on the inner surface thereof to below 75°.

Other patents of general background interest describing different types of greenhouse structures include U.S. Pat. No. 4,195,441 of Baldwin issued Apr. 1, 1980 (solar greenhouse in which plants are used as solar collectors to absorb solar radiation and store it in a heat reservoir beneath the greenhouse) and U.S. Pat. No. 4,352,256 of Kranz issued Oct. 5, 1982 (greenhouse structure including a central hub and arms comprising growth chambers extending radially outwardly therefrom).

While previous attempts to provide controlled environment horticultural installations have apparently been successful for the limited purposes for which they were developed, such structures have not really addressed the difficulties of producing horticultural crops in any quantity using natural lighting at latitudes where solar angles are very low, e.g. during winter months. Thus, for example, even with a properly maintained greenhouse installation, during winter months the solar angle may be so low that little or no fruit or vegetable production can be achieved in plants within the greenhouse. Thus, for example in Canada and the Northern United States, during the middle winter months when the solar angle is lowest, plants such as tomatoes and cucumbers will not produce vegetables. As well the growth rates of such plants are significantly reduced as compared to their growth rates during the summer months when the solar angle is greatest. Hence, up till now, it has been virtually impossible to go into large scale production of fruit and vegetables in such regions, during the winter months, and virtually all of the fresh fruits and vegetables to be consumed persons inhabiting such regions during the winter months have had to be imported from more temperate regions where the solar angle is higher and fresh fruits and vegetables can be produced either in greenhouse or outdoor conditions.

Thus, it is an object of the present invention to provide a structure and method for improved natural lighting for plant growth which will permit large scale production of horticultural crops even in conditions of relatively low solar angle such as those experienced in Northern United States or Southern Canadian areas during the winter months.

SUMMARY OF THE INVENTION

According to the present invention, a reflective surface is provided about a structure within which to grow plants. The structure comprises a translucent shell on a base enclosing a predetermined space within which plants are to be grown. The surface is situated adjacent major portions of the base, outside the shell, to reflect solar radiation into the space through the shell.

In a preferred embodiment of the present invention the reflective surface is created by water ponds located beside the base, and the structure comprises a plurality of elongated shells and bases radially extending about a central shell to which the elongated shells are interconnected to the space of the central shell. The shells are each of a shape and are positioned so as not to minimize their shadows cast at any time on another shell. The ponds are positioned between the elongated shells.

The shell of the structure may be a stressed membrane space enclosure such as is described in my U.S. Pat. No. 4,137,687 issued Feb. 6, 1979.

The structure in accordance with the present invention has significantly contributed to the winter growing, under natural lighting, of tomatoes and cucumbers at 90% of summer production rates, at the latitude of Calgary, Alberta, Canada. Heretofore such production at that latitude in the middle of winter was thought to be impossible. The plants were grown in a sealed environment within a translucent stressed fabric shell, the space between the base and shell being sealed against external environmental air conditions, and the temperature, humidity and carbon dioxide conditions within the space being controlled for optimum conditions for plant growth, as described in my co-pending U.S. application Ser. No. 947,636, filed Dec. 30, 1986.

The structure and method according to the present invention provide increased plant growth, including increased yields of fruit and vegetables, over increased periods of time at low solar angles such as experienced in winter-time in Canadian or Northern United States cities.

BRIEF DESCRIPTION OF THE DRAWINGS

These and other objects and advantages of the invention will become apparent upon reading the following detailed description and upon referring to the drawings in which.

Figure 1:
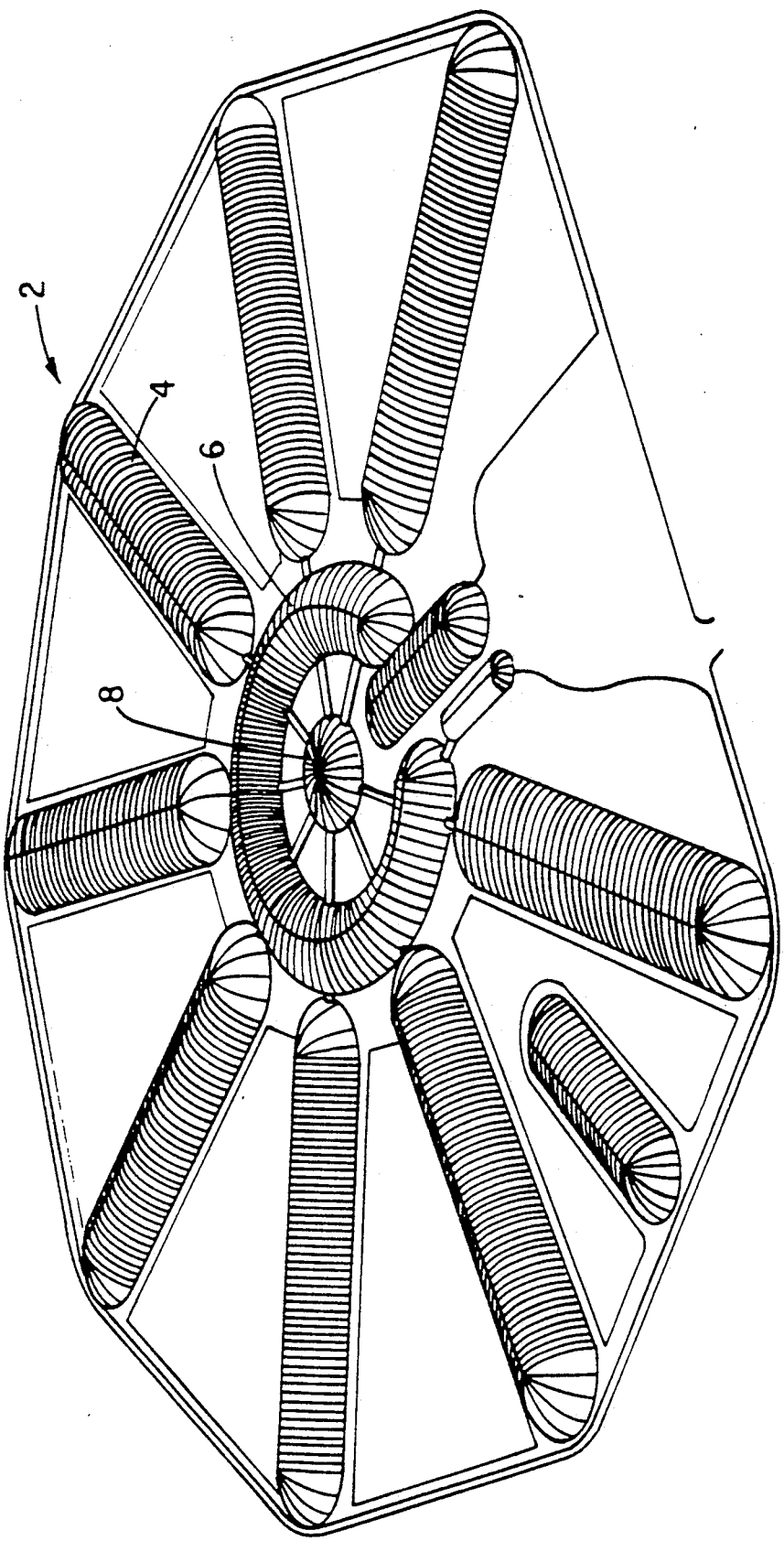
FIG. 1 is a perspective view of a structure in accordance with the present invention.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Figure 2:
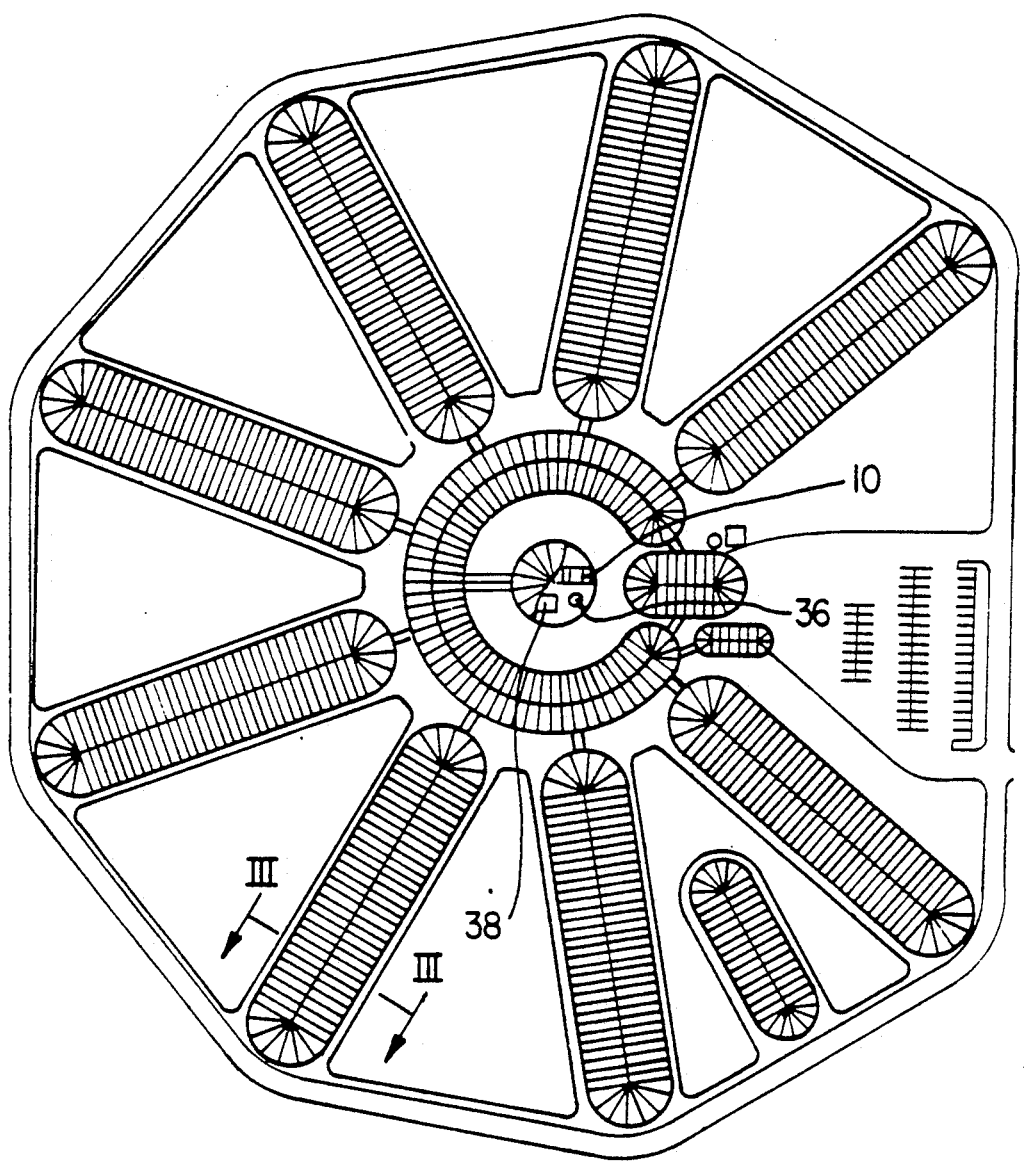
FIG. 2 is a plan view of the structure of FIG. 1.

Turning to FIGS. 1 and 2 there is illustrated a greenhouse structure 2 in accordance with the present invention, having elongated plant production areas 4 radially extending outwardly from a central plant immature crop development area 6 and a central control area 8. The production areas 4 are interconnected to the central shell of the immature crop development area 6 but not to each other, as illustrated in FIG. 2. The production and immature crop development areas 4 and 6 are enclosed by an impermeable translucent stressed fabric shell 12 situated on a base 14, the shell and base enclosing a predetermined space (e.g. production areas 4 or immature crop development areas 6). Shell 12 is preferably made of a technically woven polyvinyl chloride coated polyester scrim, with about a 95% light translucency. Such a fabric is highly effective in providing natural light inside the structure. The fabric is preferably lightweight (e.g. 18 ounces per square yard), flame resistant as well as resistant to oil, chemicals, greases, rot, mildew and certain types of bacteria which attack polyvinyl chlorides and which are prevalent in a moist environment. It is preferably held between arched rib members 15 which rest on the base, the rib members being spread to tension the fabric, for example as described in my U.S. Pat. No. 4,137,687 issued Feb. 6, 1979.

Figure 3:
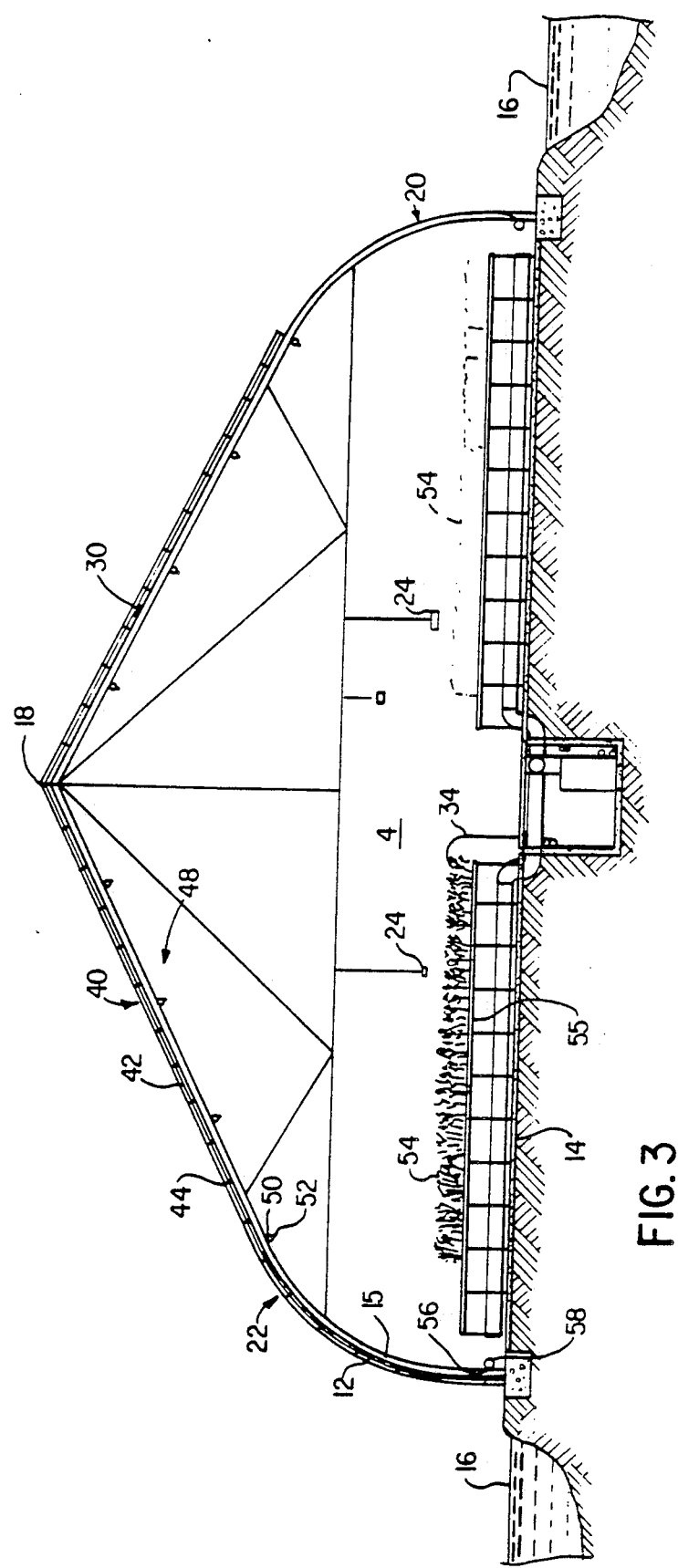
FIG. 3 is a cross-sectional view along lines III—III of FIG. 2, through a shell and base of one of the plant production areas of the structure of FIG. 1.

In addition, as can be seen in FIG. 3, the delivery of light to the interior of the structure is further enhanced by the fact that there are very few pipes, waterlines or other physical obstructions allowed above the growing root area.

Also, as illustrated in FIG. 3 base 14 for production area 4 is elevated with respect to, and surrounded by reflective surface 16, which preferably may be a light coloured surface e.g. of reflective plastic (not shown), or, water ponds as illustrated, ice surfaces (in below-freezing temperatures) or the like. In this manner, even when there is a low solar angle, light is transmitted by reflection, as well as directly, into the structure through shell 12. As can be seen in FIG. 3, the sides which make up shell 12 extend upward, from base 14, in convex fashion and meet at crest 18, forming two sides 20 and 22 for the shells of each of the elongated production areas 4. It is preferred that shells 12 and corresponding bases 14 of each of the production areas 4 and immature crop development areas 6 seal the environment within such areas against external environmental air conditions. This makes possible the close control of environmental conditions within each of the areas of the structure, such as humidity and carbon dioxide concentration. Otherwise this would not be possible.

Figure 4:
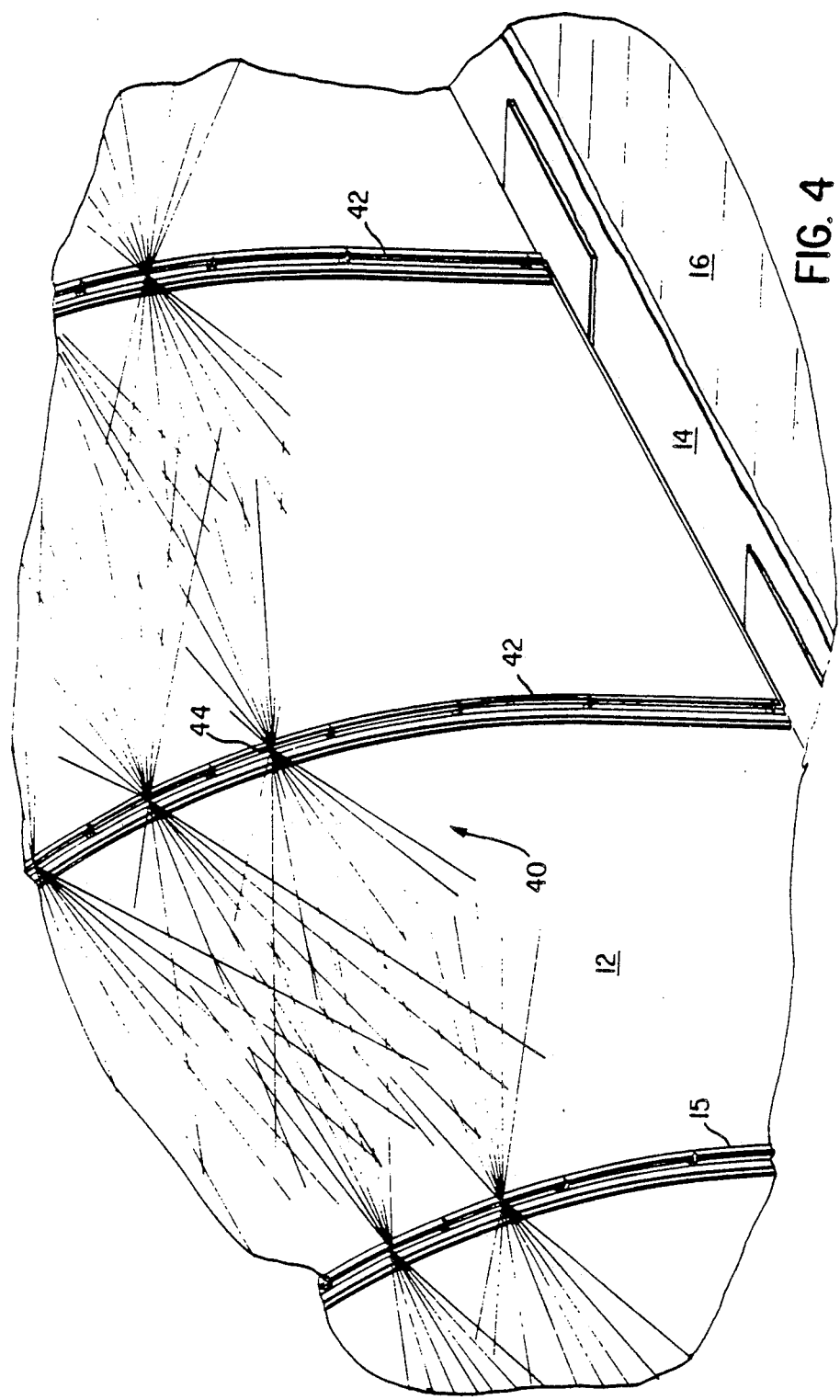
FIG. 4 is a partial view from the outside of the shell of one of such areas.

Each of the shells over production areas 4 and immature crop development areas 6 is provided with an external spray supply system 40 consisting of a series of pipes supplying water from a source 42 preferably in central control area 8, and feeding the water through these pipes to spray nozzles 44 (FIG. 4) to spray a thin film of water over the exterior surface of shell 12 to cool it as required.

To achieve this end the water is first sprayed from nozzles 44 through the air and onto the exterior of shell 12 in a dispersed pattern as illustrated. This spraying through the air provides for evaporative cooling of the water, thereby supplying additional cooling potential to shell 12. Sensors 30 in shell 12 are electronically connected to microprocessor 10 and, either on a timed sequence or as the temperature of the shell builds up to a certain range, it activates solenoid valves (not shown) to cause water to be sprayed through nozzles 44 over exterior surface of the shell to cool it. The shape of shells 12 over production areas 4 and immature crop development areas 6 is such that this water film will run down the exterior surface of the shells. Nozzles 44 are preferably directed to provide an even spray over most of the exterior surface of shell 12 over production areas 4 and 6, as required. Water so sprayed over shells 12 may be collected, for example, in the external ponds 16 forming the reflective surface, or by any other appropriate retrieval means.

Besides cooling the shell, this water from the external vapour system cleans the fabric and also magnifies and increases the light intensity as its enters the structure. This magnification factor increases the light intensity in such a way that it is much brighter inside the structure than outside, thus contributing to the significantly increased growth rate of plants experienced inside shell 12.

Thus, the structure in accordance with the present invention is highly effective in providing maximum natural light inside the greenhouse. This natural light is provided by refraction, diffusion, magnification and reflection:

(a) Refraction—As the light passes through the fabric of shell 12, it is bent. This allows all areas to receive an equal amount of light since the light waves are bent around stationary objects i.e. plants.

(b) Diffusion—As the light enters the structure it is diffused and scattered in all directions. As a result there is an equal amount of light from one side to the other for all plants. This diffusion factor also reduces any shadows that may be cast over the plants by people, plants, cable, etcetera.

(c) Magnification—The water from the external spray system 40, which cleans and cools the fabric, will also tend to magnify and focus or concentrate light ray as they enter the structure. This magnification factor increases the light intensity in such a way that it is much brighter inside the structure than outside. This increased light contributes to the improved growth rate inside the structure.

(d) Reflection—The light reflected into the structure from the ponds 16 surrounding the complex in the summer months, and snow on top of these ponds in the winter months, accounts for a large portion of the increased light intensity inside the structure. As well, ice on the ponds in winter-time not only reflects light into the space under shell 12 as well as the water in the summer, but also maintains snow, in the spring-time, on its surface a longer time than otherwise would be the case. Snow is an excellent reflector of light.

Additionally the level of light that is obtained inside the structure is substantially increased by the fact that very few pipes, waterlines or other physical obstructions, required for normal operation in the production and immature crop development areas, are allowed above the growing root area of the plants. As a result approximately 18% more light is obtained in applicant's structure as opposed to a conventional greenhouse. Also the base 14 within the structure is reflective—e.g. of white or other light reflective colour.

The actual radial layout of production areas 4 (FIGS. 1 and 2) was developed in order to maximize all available light. The distance between the structures themselves and their shape and orientation minimize the shading of the production areas 4 or immature crop development areas 6 by other areas. Since minimization of light interception is the main objective, any form of shading is undesirable. The shells thus cast shadows only at the lowest of solar elevations which only occur for a very short period of any day.

In addition, this arrangement of the structures allows for a large empty region in between each building, which, through ponds 16, is maintained full of water or ice or snow. Incidental light in these regions is thus reflected back towards production areas 4 or immature crop development areas 6. The actual amount of light which thus reaches the growing areas is greater than that which is purely incidental. In addition, because the reflected light tends to come into from below base 14 (FIG. 3), a more uniform pattern of light intensity is realized within the production areas. This low angle light enables a second crop to grow and perform under a more mature crop. Without this total light pattern, the interception of the primary incidental light by the mature plants would prevent the young plants from developing normally.

It should be noted that each of the ponds 16 is in fluid communication with adjacent ponds 16. In this manner if the water level in one pond or another, for some reason, becomes low so that pond would otherwise tend to dry out, water is supplied to that pond from the other ponds. The ponds also receive and collect water passed over the exterior surface of shells 12 by the external vapour system 40.

In one application of the invention, a series of temperature monitors 24, carbon dioxide monitors 26 and relative humidity monitors 28 are provided for the interior atmosphere within each of the production areas 4 and immature crop development areas 6 in question (FIG. 3). As well, in the shell covering each of the areas 4 and 6 are embedded temperature sensors 30. Carbon dioxide delivery systems 32 and nutrient delivery systems 34 (FIG. 1), the systems delivering respectively carbon dioxide and nutrient solution from sources preferably located in central control area 8 are provided for each of the production areas 4 and immature crop development areas 6. Microprocessor 10 (FIG. 2), electronically connected to monitors 24, 26, 28 and 30, controls the delivery of carbon dioxide from a source 36 and nutrient from reservoir tanks 38 in central control area 8 to areas 4 and 6.

The temperature and relative humidity within each of the production areas 4 and immature crop development areas 6 is controlled by a sophisticated and sometimes interrelated series of systems. First of all, for temperature control, each of the shells over production areas 4 and immature crop development areas 6 is provided with an external spray system 40 (FIGS. 3, 4) consisting of a series of pipes 42 supplying water which may be, for example from a source (not shown) in central control area 8 or from ponds 16, and feeding the water through these pipes to spray nozzles 44 (FIG. 4) to spray a thin film of water over the exterior surface of shell 12 to cool it as required. Sensors 30 in shell 12 are electronically connected to microprocessor 10 and, either on a timed sequence or as the temperature of the shell builds up to a certain range, it activates solenoid valves (not shown) to cause water to be sprayed through nozzles 44 over exterior surface of the shell to cool it. The shape of shells 12 over production areas 4 and immature crop development areas 6 is such that this water film will run down the exterior surface of the shells. Nozzles 44 are preferably directed to provide an even spray over most of the exterior surface of shell 12 over production areas 4 and 6, as required. Water so sprayed over shells 12 may be collected, for example, in the external ponds 16 forming the reflective surface, or by any other appropriate retrieval means.

Internally, temperature control is achieved through internal mist generation system 48 (FIG. 3) which comprises water supply pipes 50 feeding fog nozzles 52, which nozzles produce, as required, a fine mist or cloud in the atmosphere in the space over plants 54. This internal mist generation system is activated by temperature monitors 24 electronically connected to microprocessor 10, which microprocessor activates the internal mist generation system when the temperature within the immature crop development or production area exceeds a predetermined level or on a timed sequence.

The production of the mist or cloud causes cooling in two ways. Firstly, it impedes the passage of rays of sunlight to the plants, thereby cooling by shading. Secondly, as the mist or cloud evaporates under the heated conditions within the shell, the evaporation draws heat from the environment in the space in the shell. The evaporated water vapour condenses on the cooler shell surface (cooled if necessary by external spray system 40), passing the heat of condensation into the shell fabric. The shell fabric is of a heat conductive material and heat is thereby passed from the internal to the external side of the shell and out of the internal environment of production area 4 or immature crop development area 6.

Water vapour thus condensing on the interior surface of shell 12 (which may include water vapour from transpiration of the plants 54) travels down the sides of the shell and is collected by means of collection skirts 56 passing into slots 57 in collection pipes 58 (FIG. 5), collection pipes 58 returning this condensed water to a central location where it may be used as required, preferably being mixed with nutrient in tanks 38 (FIG. 1). This system thus acts as a large scale water distillation system, the water received by the plants in solution with the nutrient having been purified by means of this distillation process.

As well, as one can imagine, one of the problems of adapting a greenhouse structure in which the internal environment is sealed against external environmental air conditions, when applied to large scale production from crops within the greenhouse, is the build up of water vapour in the air. This build up results from transpiration from the plants. If it is permitted to continue unchecked, the relative humidity in the greenhouse structure will build up to the point that transpiration of the plants is significantly impeded. As plants require transpiration for example to cool their leaves and to draw nutrient solution through the plant system, the growth of the plant is thus adversely affected. While the structure could be opened to the outside environment to permit the humidity which has become built up within the structure to escape, this may create unwanted temperature differentials within the greenhouse structure and be quite impractical, for example in winter conditions. It will be readily understood, therefore, that the condensation of water vapour on the interior surface of shell 12 and the removal of that condensed water by means of collection skirts 56 and collection pipes 58 helps to control the humidity conditions within the greenhouse structure so that proper transpiration of the plants is continuously permitted without requiring the greenhouse structure to be opened up to the outside environment.

The cooling of the areas 4 and 6 is most important because of the tremendous heat build up which occurs in such areas during solar radiation of structure 2 particularly during summer, spring and fall months. During winter or cool external conditions however, where heating is required, that heating is provided by appropriate furnaces 60 (FIG. 3). These may be gas, oil or electric preferably. Again, in order to minimize obstructions to light passing to plants 54, these furnaces are positioned in basement channel 62 below the floor of base 14 (FIG. 3).

Humidity conditions within each of the areas 4 and 6 may also be controlled by microprocessor 10 as required, as dictated by relative humidity sensors 28, by passing water through supply pipes 50 and passing it into the atmosphere as a cloud or mist through fog nozzles 52. Alternatively separate sets of supply pipes or valves may be used for controlling relative humidity.

It will be understood that nutrient delivered through nutrient delivery system 34 is passed to trays 55 in which sit the roots of plants to be grown (in production areas 4) or inert blocks of seeds or seedlings (immature crop development areas 6). As is conventional in the art, excess nutrient not required by the plants, seeds or seedlings is collected and returned to nutrient tanks 38. Thus it is preferred to slope base 14, particularly in each production area 4 downwardly from the centre towards the sides and from the outer ends to the inner ends to facilitate collection of excess nutrient and water from these areas.

Because of the computerized control of the various aspects of the internal environment in production areas 4 and immature crop development areas 6, nutrient concentrations, carbon dioxide concentrations, relative humidity and temperature may be adjusted to suit the particular type of plant being grown or the stage of growth of that plant. Microprocessor 10 may be appropriately programmed to modify these environmental conditions for the plants over the life of the plants, to ensure optimum plant growth. As well, it is preferred to provide an appropriate alarm signal so that when such environmental conditions exceed a desired range for proper plant growth, the alarm will sound and, if required, a manual override and manual adjustment of such conditions may take place.

Using the light reflecting feature of the present invention in conjunction with the computerized control of the various factors of the internal environment such as carbon dioxide concentration, temperature and relative humidity in the air and concentration of the nutrient delivered to the plants (where a nutrient film system is used) in production areas 4 and immature crop development areas 6 as described and illustrated in my co-pending U.S. patent application Ser. No. 947,636, filed Dec. 30, 1986, significantly improved results in growing tomatoes and cucumbers have been achieved over traditional greenhouse technology. Not only has it been possible to produce such vegetables on a year round basis in parts of Canada where, previously, even under controlled environment greenhouse conditions, it was difficult or not possible to produce them during the winter months, but also significant, large scale production has been achieved. That production has, even during winter months, been 90% of summertime production.

COMPARATIVE TESTING

In experiments conducted growing tomatoes and cucumbers in accordance with the present invention, in Calgary, Alberta, Canada, significantly improved results including continuous production, higher densities and faster growth during winter months over traditional greenhouse technology have been achieved. Indeed, before the present invention, mass production of such vegetables during winter months at such a latitude had been unknown.

Compared with conventional greenhouse systems, the controlled environment system according to the present invention permits a production line (e.g. Alpha production units) which will produce for a peak production period. As this period phases out, a neighbouring production line (Beta production unit) enters its peak production period. The Alpha line is then removed and replaced with a young Alpha production line which will come into peak production as Beta production line phases out. This rotation allows for continuous peak production 365 days a year. Conventional systems, while sometimes having two production lines, do not allow for continuous production from the lines, a gap in production occuring between the termination of production of one line and the commencement of production of the other. As well, the production cycle is not for the peak period but rather for a much longer cycle. Production over the year is not 365 days a year. Several months are non-productive periods, particularly during winter months.

In addition, for example with cucumbers, applicant's system permits higher density production. Cucumbers for example may be grown in a 1.75 square foot spacing whereas, with conventional greenhouse nutrient feed systems, that spacing is 6 square feet at the latitude in question.

As for faster growth, over a period of January to May, cucumber plants grown in accordance with applicant's invention have produced 50 cucumbers per plant (at much higher densities than conventional nutrient feed systems). Conventional nutrient feed systems at this latitude have produced 25 cucumbers per plant over this period of time. Prior to mid-February, cucumber crops according to conventional nutrient feed technology do not produce and, by mid-February, such systems have been producing 5 to 8 cucumbers per plant. Cucumbers grown in applicant's invention have produced 25 cucumbers per plant during the entire winter.

Thus it is apparent that there has been provided in accordance with the invention a method and structure for improved natural lighting for plant growth that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A method of growing horticultural crops in conditions of low solar angle which comprises
   growing plants in a sealed environment within translucent shells on bases enclosing predetermined spaces within which the crops are to be grown, the shells and bases being disposed in a radial layout, and
   locating a plurality of wedge-shaped unobstructed light reflective surfaces in an alternating manner between the radially disposed shells, the light reflective surfaces being disposed to reflect sunlight at a low solar angle through adjacent translucent shells in an amount sufficient for crop development therein.

2. A method according to claim 1 wherein the reflective surface is a pond located beside the base to provide the reflective surface.

3. A method according to claim 2 wherein the pond is positioned slightly below the level of the base.

4. In combination,
   a plurality of stressed fabric structures disposed in a radial layout, each said structure including a translucent impermeable stressed fabric shell enclosing a predetermined space for crop development in sealed relation against external environmental air conditions; and
   a plurality of wedge-shaped unobstructed light reflective surfaces disposed in alternating manner between said structures, each surface being disposed to reflect sunlight at a low solar angle into an adjacent structure through said shell thereof in an amount sufficient for crop development therein.

5. The combination as set forth in claim 4 wherein said structures are spaced apart to cast a shadow from one structure onto another structure only at the lowest of solar elevations.

6. A structure according to claim 4 comprising a plurality of elongated shells and bases radially extending about a central shell on a corresponding base, the central shell and corresponding base enclosing a predetermined central space, the spaces within the elongated shells being interconnected to the space of the central shell, the shells each of a shape and being positioned so as not to cast a shadow at any time on another shell, the ponds positioned between the elongated shells.

7. A structure according to claim 4 wherein the shell consists of a fabric of technically woven polyvinyl chloride coated polyester scrim having about a 95% light translucency.

8. The combination as set forth in claim 4 wherein each said structure has a base disposed within said shell thereof and elevated above adjacent light reflective surfaces to permit reflective light to reach said predetermined space of said respective structure.

9. The combination as set forth in claim 4 wherein each said light reflective surface is a surface of a water pond.

10. A structure according to claim 8 wherein the base is of a light, reflective colour.

11. The combination as set forth in claim 4 wherein the light reflected from each said surface into a respective structure is greater than incidental light passing into said respective structure.

12. The combination as set forth in claim 4 wherein each structure is elongated and centrally peaked at a crest thereof.

* * * * *